(12) United States Patent
Kato et al.

(10) Patent No.: US 6,430,128 B1
(45) Date of Patent: Aug. 6, 2002

(54) METHOD FOR READING OPTICAL INFORMATION MEDIUM AND OPTICAL INFORMATION MEDIUM

(75) Inventors: Tatsuya Kato; Hajime Utsunomiya; Takashi Kikukawa; Hiroshi Shingai, all of Tokyo (JP)

(73) Assignee: TDK Corporation, Tokyo (JP)

( * ) Notice: Subject to any disclaimer, the term of this patent is extended or adjusted under 35 U.S.C. 154(b) by 75 days.

(21) Appl. No.: 09/714,963

(22) Filed: Nov. 20, 2000

(30) Foreign Application Priority Data

Nov. 30, 1999 (JP) .......................... 11-340538
Aug. 22, 2000 (JP) ........................ 2000-251511

(51) Int. Cl.⁷ ................................. G11B 5/09
(52) U.S. Cl. .................. 369/47.53; 369/275.4
(58) Field of Search ............... 369/47.5, 47.51, 369/47.53, 53.2, 53.22, 53.26, 53.27, 275.4

(56) References Cited

U.S. PATENT DOCUMENTS 6,249,489 B1 * 6/2001 Fujii et al. ............... 369/275.4
6,262,966 B1 * 7/2001 Tsuchiya ................. 369/275.4

FOREIGN PATENT DOCUMENTS

| JP | 5-205314 | 8/1993 |
|---|---|---|
| JP | 8-96412 | 4/1996 |
| JP | 2844824 | 10/1998 |
| JP | 10-340482 | 12/1998 |
| JP | 11-86342 | 3/1999 |
| JP | 11-126340 | 5/1999 |

\* cited by examiner

Primary Examiner—Paul W. Huber
(74) Attorney, Agent, or Firm—Oblon, Spivak, McClelland, Maier & Neustadt, P.C.

(57) ABSTRACT

The present invention provides a method for determining optimal read power adapted for use in an optical information medium wherein super-resolution readout beyond diffraction limit is conducted. Also provided is an optical information medium adapted for use in such method. In this method, when the readout is conducted under the conditions: $L_{MIN} < \lambda/4NA$, and when reading light has a wavelength $\lambda$, objective lens of readout optical system has a numerical aperture NA, and minimum mark of the marks constituting the information pattern has a length $L_{MIN}$, a short mark having a length $L_S$ and a long mark having a length $L_L$ meeting the relations: $L_S < \lambda/4NA$, and $L_L \cong \lambda/4NA$ are preliminarily formed in the optical information medium, and the optimal power of the reading light is determined on the output when said short mark and said long mark are read.

3 Claims, 2 Drawing Sheets

METHOD FOR READING OPTICAL INFORMATION MEDIUM AND OPTICAL INFORMATION MEDIUM

BACKGROUND OF THE INVENTION

1. Field of the Invention

This invention relates to a method for reading an optical information medium formed with record marks of the size smaller than diffraction limit, and an optical information medium adapted for use in such method.

2. Prior Art

Various types of optical information media are known in the art including read only optical discs such as compact discs, rewritable optical recording discs such as magneto-optical recording discs and phase change optical recording discs, and write-once optical recording discs such as those utilizing organic dyes for the recording material.

In the case of an optical information medium, information density can be generally increased to a level higher than magnetic recording media. However, further increase in the information density is required in view of the enormous amounts of information that should be handled in the case of image data and the like. Typical methods used for increasing the information density per unit area are reduction of the track pitch and increase of linear density by reducing the distance between the record marks or phase pits. However, excessive increase in the track density and the linear density in relation to the beam spot of the reading light is associated with unduly reduced CNR (carrier to noise ratio), and the signals eventually becomes unreadable. The resolution in the reading of signals is determined by the diameter of the beam spot, and more specifically, the read limit is generally spatial frequency $2NA/\lambda$ when the reading light has a wavelength of $\lambda$ and the optical system of the reading system has the numerical aperture, NA. Accordingly, reduction in the wavelength of the reading light and increase in NA are effective in improving the CNR and the resolution upon reading. Although many technical investigations are underway, various technical problems are to be solved before introduction of such techniques.

In view of such situation, various methods for surpassing the read limit determined by the light diffraction, namely, the so-called super-resolution readout methods have been proposed.

The super-resolution readout method most typically used is the method wherein a mask layer is disposed on the recording layer. In this method, an optical aperture smaller than the beam spot is formed in the mask layer by utilizing the fact that the intensity of the laser beam spot is in Gaussian distribution to thereby reduce the size of the beam spot to a size smaller than the diffraction limit. Such method is roughly categorized by the difference in the mechanism of optical aperture formation into heat mode system and photon mode system.

In the heat mode system, the area in the mask layer within the beam spot that has reached the predetermined temperature undergoes change in optical properties. Such heat mode system is used, for example, in the optical disc described in Japanese Patent Application Laid-Open No. (JP-A) 205314/1993. This optical disc has a transparent substrate having optically readable record pits formed thereon according to the information signals, and a layer disposed thereon comprising a material that experiences change in reflectivity by the temperature. This layer functions as the mask layer. The materials specifically named in JP-A 5-205314 are lanthanoids. In the optical disc described in JP-A 5-205314, reflectivity of the layer formed of the material as described above changes corresponding to the temperature distribution within the scanning spot of the readout beam, and the reflectivity returns to the initial level after the completion of the readout by the temperature decrease and the layer does not melt in the reading operation. The heat-mode super-resolution is not limited to the one as described above, and also known is the system as disclosed in Japanese Patent No. 2844824 wherein a material which undergoes amorphous-crystalline transition is used for the mask layer so that the high-temperature area within the beam spot undergoes phase transition to become crystalline and to exhibit improved reflectivity whereby super-resolution readout is enabled.

In the heat mode super-resolution, the size of the optical aperture is uniquely determined by the temperature distribution of the mask layer. Accordingly, the optimal power of the reading light should be determined by taking all of the linear velocity of the medium, the power of the reading light, the temperature of the atmosphere surrounding the medium during the readout operation into consideration.

In the case of the photon-mode super-resolution, change in the optical properties occurs in the area wherein amount of the photon has reached the predetermined value. The photon-mode super-resolution is utilized, for example, in the information recording medium described in JP-A 96412/1996, in the optical recording medium described in JP-A 86342/1999, and in the optical information recording medium described in JP-A 340482/1998. JP-A 96412/1996 discloses a mask layer comprising a resin having a phthalocyanine or its derivative dispersed therein and a mask layer comprising a chalcogenide. JP-A 86342/1999 discloses use of a mask layer comprising a super-resolution readout film comprising a semiconductor material having a photonic band gap at which the light absorption properties undergo a change by excitation of the electron to the energy level of the exciton by the irradiation of reading light. Exemplary mask layer disclosed therein is a mask layer comprising a matrix of $SiO_2$ having CdSe fine particles dispersed therein. JP-A 340482/1998 discloses use of a mask layer comprising a glass layer wherein the intensity distribution of the light that has transmitted through the mask layer varies in a non-linear relationship with the intensity distribution of the light irradiated.

In the case of a photon-mode super-resolution readout medium, the medium is not influenced by the temperature surrounding the medium during the reading operation in contrast to the heat-mode super-resolution readout medium, and the medium is relatively resistant to deterioration by repeated read operations.

In the case of a photon-mode super-resolution, the area which undergoes change in optical properties is determined by the number of photons that has entered the area, and such number depends on the linear velocity of the medium in relation to the beam spot. The size of the optical aperture also depends on the power of the reading light in the photon mode super-resolution, and application of an excessive power results in the formation of an excessively large optical aperture and the super-resolution readout is no longer possible. In other words, determination of the optimal power for the reading light is also necessary in the case of photon-mode super resolution depending on the linear velocity and the size of the pit and record mark of the medium to be read.

Determination of optimal read power is necessary in the super-resolution readout as described above irrespective of whether the readout is conducted by heat-mode super-resolution or photon-mode super-resolution.

Various proposals have been made for the determination of the optimal read conditions and an exemplary such proposal is provision of a test area for test read of the optical information medium. For example, JP-A 126340/1999 discloses a method wherein a plurality of test areas are provided at different radial positions for the determination of the optimal read power which varies by the operating temperature and the distance from the center. In JP-A 126340/1999, test read is conducted by altering read power in each test area, and the optimal read power is determined from the error rate of the readout signals. JP-A 126340/1999 also discloses that the evaluation of the readout signals may be conducted on the bases of signal amplification. In the procedure specifically described in JP-A 126340/1999, optimal read power is determined in a magneto-optical disc adapted for MSR (Magnetically induced Super Resolution) technology by reading a test pattern of single signal comprising record marks and the spaces therebetween each having a length 0.38 µm. JP-A 126340/1999, however, is silent about whether the record mark having a length of 0.38 µm is of a size beyond the diffraction limit.

However, incorporation of an error rate-detection circuit in a commercially available optical drive is impractical in economical point of view. Determination of the optimal read power by the use of absolute value of the amplitude of the signal that has been read out is also associated with difficulty since signal processing system of an optical disc drive has AGC (automatic gain control) function incorporated therein for the control of the level of the readout signal.

SUMMARY OF THE INVENTION

In view of the situation as described above, an object of the present invention is to provide a method for determining optimal read power for the optical information medium adapted for high resolution readout beyond diffraction limit. Another object of the present invention is to provide an optical information medium used in such method.

The objects as described above are attained by the (1) to (3), below.

(1) A method for reading an optical information medium wherein readout is conducted under the conditions wherein the relation:

$L_{MIN} < \lambda/4NA$ is met when reading light has a wavelength $\lambda$, objective lens of readout optical system has a numerical aperture NA, and minimum mark of the marks constituting the information pattern has a length $L_{MIN}$; wherein a short mark having a length $L_S$ and a long mark having a length $L_L$ meeting the relations:

$L_S < \lambda/4NA$, and $L_L \approx \lambda/4NA$ are preliminarily formed in the optical information medium, and the optimal power of the reading light is determined on the output of said short mark and the output of said long mark are read.

(2) A method for reading an optical information medium according to the above (1) wherein said optical information medium has a data recording area and a test read area, and said short mark and said long mark are preliminarily formed in said test read area.

(3) An optical information medium wherein readout is conducted under the conditions wherein the relation:

$L_{MIN} < \lambda/4NA$ is met when reading light has a wavelength $\lambda$, objective lens of readout optical system has a numerical aperture NA, and minimum mark of the marks constituting the information pattern has a length $L_{MIN}$, and wherein said optical information medium has a data recording area and a test read area and a short mark having a length $L_S$ and a long mark having a length $L_L$ meeting the relations:

$L_S < \lambda/4NA$, and $L_L \approx \lambda/4NA$ are preliminarily formed in said test area.

DETAILED DESCRIPTION OF THE INVENTION

Figure 1:
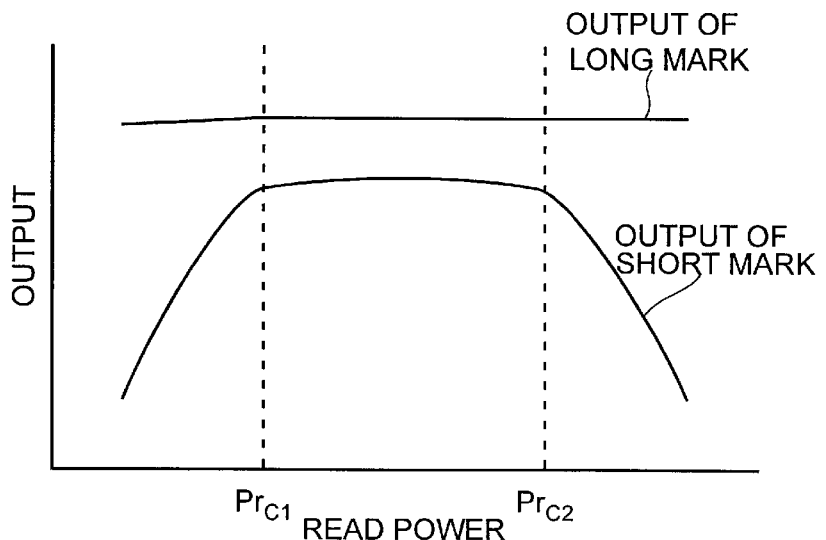
FIG. 1 is a graph showing output during the readout in relation to the read power in the super-resolution readout medium.

The optical information medium adapted for use in the present invention has a data recording area and a test read area. The optical information medium may be either a read only medium or a recordable (write once or rewritable) medium. In the case of the read only medium, the data recording area has marks constituting the information pattern (phase pits which are generally concave or convex) preliminarily formed therein. In the case of the recordable medium, the data recording area is the area where the marks constituting the information pattern (record marks) are to be written. The marks provided in this area may be either phase pits or record marks irrespective of whether the medium is a read only medium or a recordable medium.

The optical information medium used in conducting the method of the present invention is a medium wherein readout beyond diffraction limit is enabled, namely, a super-resolution readout medium. When the reading light has a wavelength of $\lambda$, and the objective lens of the readout optical system has a numerical aperture of NA, a mark train wherein the marks and the spaces therebetween are of equal length can be read when the spatial frequency is up to $2NA/\lambda$. In other words, the mark which are readable has a length of $\lambda/4NA$ or more. Accordingly, the medium adapted for super-resolution readout is an optical information medium wherein readout is conducted under the conditions meeting the relation:

$L_{MIN} < \lambda/4NA$ when the minimum mark constituting the information pattern has a length $L_{MIN}$.

The test read area of the optical information medium according to the present invention has a short mark having a length $L_S$ and a long mark having a length $L_L$ meeting the relations:

$L_S < \lambda/4NA$, and $L_L \cong \lambda/4NA$ preliminarily formed therein. In other words, the short mark has a length which can be read by super-resolution readout, and the long mark has a length which can be read by conventional readout. The short mark is adjusted to a length which does not exceed the minimum mark length of the data recording area, and preferably, to a length equal to the minimum mark length, while the length of the long mark may be determined independently from the mark length of the data recording area. However, when the maximum mark length in the data recording area is $\lambda/4NA$ or more, the length of the long mark is generally adjusted to a length equal to the maximum mark length. A stable readout will be enabled when the long mark has a longer length since deterioration of MTF (Modulation transfer function) by the influence of the disturbance and aberration of the optical system is reduced. A reliable determination of the optimal read power will be then enabled.

Next, the method for determining optimal read power by using the optical information medium of the present invention is described by taking as an example a medium having a mask layer wherein an optical aperture is formed in heat mode or photon mode.

The mask layer used in the super-resolution readout undergoes change in optical properties in the area irradiated with the laser beam of intensity higher than the predetermined value, and as a consequence, an optical aperture having an increased reflectivity or transmittance is formed in such area. Since the short mark as described above has a length shorter than the resolution limit, output of the short mark by the readout is not obtained unless the optical aperture is formed.

On the other hand, output of the long mark is also obtained in the absence of the optical aperture formation. In the super-resolution readout medium having a mask layer, the reflectivity or the transmittance of the mask layer is not zero even in the absence of the optical aperture formation, and therefore, output of the long mark is obtained when the reading light of the power insufficient for the aperture formation is directed to the mask layer. In addition, the output of the long mark does not substantially vary by the formation of the optical aperture of the size sufficient for the reading of the short mark. In other words, the output of the long mark is substantially constant and independent from the increase in the power of the reading light.

The output of the mark depends on the read power in a manner as described below. The minimum power for the optical aperture formation is referred to as the first critical power, and the power at which the output of the short mark suddenly drops by excessive growth of the optical aperture is referred to as the second critical power. As shown in FIG. 1, the output of the short mark rapidly increases near the first critical power $Pr_{C1}$ before substantial saturation. The output then rapidly decreases near the second critical power $Pr_{C2}$. On the other hand, the output of the long mark is saturated before the read power reaches the first critical power $Pr_{C1}$, and the output is maintained at the substantially constant level after exceeding the second critical power $Pr_{C2}$.

Next, the method of the optimal read power determination according to the present invention is described. The present method utilizes behavior of the output of both the short mark and the long mark, and the optimal read power is determined not on the bases of either one of the outputs but on both outputs, namely, output of the short mark which varies on the optimal power of the reading light as well as the output of the long mark which is substantially constant and independent from the read power. The sufficiency of the output is determined by comparing the output of the short mark in relation to the output of the long mark. The method of determining only the output of the short mark, for example, suffers from the difficulty of determining optimal value of the output itself because of the presence of the gain control circuit and other factors. In contrast, in the method of the present invention, the output level of the short mark is evaluated by referring the output of the long mark, and therefore, influence of the signal processing circuit such as the gain control circuit can be excluded.

In the present invention, the optimal read power is determined by using the output of the long mark for the reference and by selecting the optimal read power from the range wherein the output level of the short mark in relation to the output of the long mark is sufficient. There is no strict criteria for the evaluation, and the optimal read power selected may be either the one near the first critical power, the one between the first critical power and the second critical power, or the one near the second critical power. However, it should be noted that use of a lower power for the read power results in the reduced damage of the mask layer and extension of the life of the laser device used for the reading light as long as sufficient power is obtained in the readout of the short mark. In view of such situation, selection of a power near the first critical power for the optimal read power is preferable in the present invention. As described above, output of the short mark rapidly increases near the first critical power before substantial saturation, and in the present invention, the read power immediately before such saturation of the output may be preferably employed for the optimal read power. In the conventional medium which is not subjected to the super-resolution readout, there is no problem in using the read power that results in the highest output for the optimal read power, and use of such read power may be more preferable. The medium used for the present invention, however, is the one which is subjected to super-resolution readout wherein a read power relatively higher than the conventional readout is employed, and therefore, care should be taken for the damage of the mask layer and the life of the laser device. In view of such situation, use of a power near the first critical power for the optimal read power is preferable even when the output of the short mark reaches the maximum at the read power between the first critical power and the second critical power.

The procedure for determination of the optimal read power is not particularly limited. The optimal read power, however, is preferably determined by using the procedure as described below. In this procedure, the optical head is initially moved to the test read area, and the short mark and the long mark are read. The procedure of reading the short mark and the long mark is repeated by incrementally increasing the read power. The read power at which the ratio of the short mark output to the long mark output exceeds the predetermined value; or the read power at which the ratio of the long mark output to the short mark output is less than or equal to the predetermined value and the change rate of such ratio has reduced to the predetermined value is selected for the optimal read power. Adjustment of the optimal read power to a value near the first critical power $Pr_{C1}$ as indicated in FIG. 1 is thereby enabled. It should be noted that the predetermined values for the ratios and the change rate as described above may be preliminarily set depending on the specification of the optical information medium to be read or by conducting experiments.

Specific procedure of such method is as described below. In this procedure, output of the short mark in relation to the output of the long mark is defined as the super-resolution index. In the determination, the optical disc to be read is first loaded on an optical disc reader. When the reader confirms that the optical head of the reader is located at the position opposing the test read area of the optical disc, the test read is conducted at relatively low initial power $Pr_1$, and the super-resolution index $R_1$ at the read power $Pr_1$ is determined from the output. Next, similar readout is conducted at read power $Pr_2$ which is slightly higher than $Pr_1$ to determine the super-resolution index $R_2$ at the read power $Pr_2$. Next, change rate of the super-resolution index $G(R_2)$ at the read power $Pr_2$ is calculated by the equation:

$$G(R_2)=(R_2-R_1)/R_2$$

The procedure as described above is repeated until the super-resolution index $R_n$ at the n-th readout operation reaches the predetermined value and the change rate $G(R_n)$ of $(R_n-R_{n-1})/R_n$ reduces to the predetermined value. The read power $Pr_n$ at such timing is designated the optimal read power, and the readout of the optical disc is conducted at such power. It should be noted that the increment of the read power increase $(Pr_n-Pr_{n-1})$ is maintained at a constant value, and the increment is preferably selected from the range of 0.5 to 2 mW by taking the time required for the setting of the optimal read power and the accuracy of the setting into consideration.

The present invention is applicable not only to the super-resolution read medium having a mask layer, but also to a super-resolution readout medium not utilizing such mask layer. An exemplary super-resolution readout medium which does not utilize the mask layer and which is adapted for use with the present invention is an optical information medium disclosed in Japanese Patent Application No. 302558/1999 filed by the inventors of the present invention. This optical information medium has a functional layer comprising a particular material and a thickness corresponding to the particular material used. This functional layer enables the super-resolution readout by a mechanism utterly different from that of the conventional super-resolution readout medium having a mask layer. The particular material used for the functional layer may comprise at least one element selected from single substance, alloy or a compound thereof containing Nb, Mo, W, Mn, Pt, C, Si, Ge, Ti, Zr, V, Cr, Fe, Co, Ni, Pd, Sb, Ta, Al, In, Cu, Sn, Te, Zn, or Bi. In the conventional super-resolution readout medium using a mask layer, intensity of the light reflected from or transmitted through the mask layer Varies in correspondence with the formation of the optical aperture. More specifically, reflectivity or transmittance of the mask layer changes at a particular read power when the read power is increased. In contrast, in the super-resolution readout medium having the functional layer as described above, the reflectivity or the transmittance of the functional layer does not change with the increase in the read power. In addition, while the output is substantially constant between the first critical power and the second critical power in the conventional super-resolution readout medium using a mask layer, the reflectivity or the transmittance generally increases with the increase in the read power in the super-resolution readout medium having the functional layer as described above, and such increase in the output is saturated at a power lower than the power at which the functional layer become broken. More specifically, the behavior of the output of the short mark in relation to the read power is, for example, the one shown in FIG. 2A or 2B.

Figure 2A:
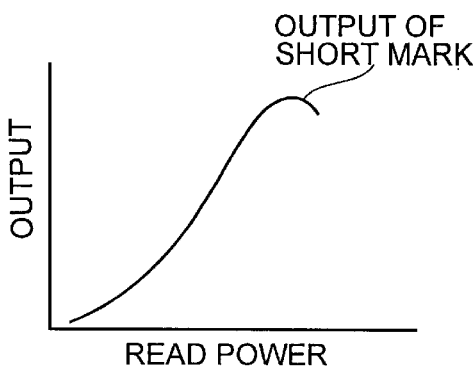
FIGS. 2A, 2B and 2C are graphs showing output during the readout in relation to the read power in the super-resolution readout medium.
Figure 2B:
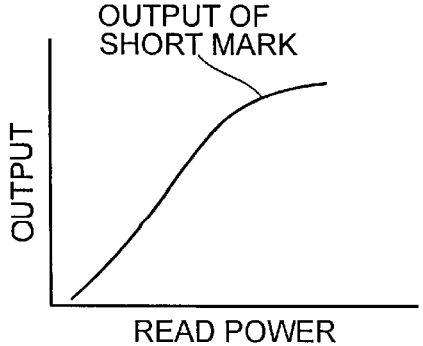

When the present invention is applied to the super-resolution readout medium as described above, thermal damage of the functional layer exceeds the acceptable level when the read power exhibiting the maximum output is adopted as the optimal read power as evident from FIG. 2A and FIG. 2B. In view of such situation, the method of the present invention is particularly effective if the optimal read power selected is the read power at which the change rate of the super-resolution index reduces to the predetermined value or less, and not the read power at which the output of the short mark reaches its maximum.

Figure 2C:
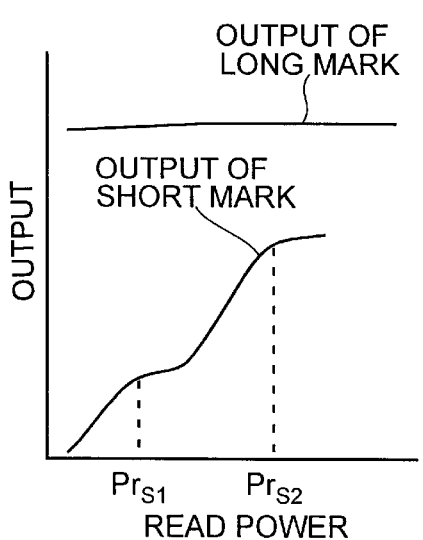

It should be noted that the present invention is particularly effective when the behavior of the output of the short mark in relation to the read power is as illustratively shown in FIG. 2C, namely, when the increase rate of the output is once reduced at a relatively low read power of $Pr_{S1}$, and again, at the read power of $Pr_{S2}$ before the maximum output as in the case of FIG. 2A or FIG. 2B. In such a case, when only the change rate of the output of the short mark associated with the increase in the read power is used for the reference, there is considerable risk of selecting the read power $Pr_{S1}$ on the low power side for the optimal read power. In contrast, when the change rate in the ratio of the short mark output to the long mark output is used for the reference in accordance with the present invention, the case of selecting the read power $Pr_{S1}$ for the optimal read power can be avoided since output of the short mark is insufficient in relation to the output of the long mark at the read power $Pr_{S1}$.

The position of the test read area is not particularly limited. For example, when the present invention is applied to a disc-shaped medium, the test read area may be provided either along the inner periphery or along the outer periphery of the medium. Also, the pattern of the short and the long mark arrangement in the test read area is not particularly limited. Although at least the short mark and the long mark should be provided in the test read area in the present invention, provision of other marks in the area is not prohibited.

The method of mark formation in the test read area is not particularly limited. An exemplary method in the case of the read only medium and the recordable medium is provision of the marks as phase pits in the substrate itself at the time of the substrate production. The mark may be also provided by forming phase pits or pits of different reflectivity by using a patterning means such as screen printing. In the case of recordable medium, the test read area may be also formed by writing the short and long marks in the medium after the production of the medium.

It should be noted that the presence of the long mark in the data recording area is not critical in the present invention. In other words, the marks bearing the recorded information may solely comprise the short marks.

The present invention is characterized by the determination of the optimal power of the reading light by conducting the test read of both the short mark and the long mark and selecting the optimal power on the bases of the output of the marks, and in view of such mechanism, both the short mark and the output of the long mark are preferably formed in the present invention together in the test read area for facilitating alternate readout of the short and long marks. However, the present invention can be conducted as long as the output of the short and the long marks are obtained, and it is also possible to adopt a constitution wherein the short mark and the long mark preliminarily formed in the data recording area are utilized without forming the independent test read area. In this case, the marks bearing the recorded information can be used for such short mark and long mark preliminarily provided in the data recording area, and if no long mark is included in the marks bearing the recorded information, a long mark should be provided in the data recording area for the purpose of the test read.

The super-resolution readout medium adapted for use in the present invention is not limited to the medium utilizing the mask layer or the medium utilizing the functional layer as described above. In other words, the present invention is applicable to a super-resolution medium irrespective of the mechanism of the super-resolution readout as long as the medium 10 is of the type wherein the output of the short mark is seriously influenced by the read power, and the output of the long mark is less likely to be influenced by the read power.

EXAMPLES

A sample of read only optical disc as disclosed in the Japanese Patent Application No. 302558/1999, supra was prepared. This optical disc is a disc wherein a functional layer is disposed on the substrate formed with pits. The substrate used was an injection molded polycarbonate disc having a diameter of 120 mm and a thickness of 0.6 mm, and the disc had phase pits formed simultaneously with the injection molding of the disc. The pits were formed in the area of 23.5 to 24.0 mm in diameter from the center of the disc, and this area was used as the test read area. The pits formed were those based on 1-7 modulation system, and the pit corresponding to the minimum signal (used as the short mark) had a length of 250 nm, and the pit corresponding to the maximum signal (used as the long mark) had a length of 1000 nm. It should be noted that the sample has an address signal recorded at a predetermined position to indicate the location of the test read area and to thereby enable the movement of the optical head to the test read area. The functional layer is a silicon layer having a thickness of 15 nm formed by sputtering.

Test read of this sample was conducted on an optical disc evaluater (laser wavelength, 634 nm; numerical aperture, 0.60) at a linear velocity of 11 m/s. In the test read operation, the change rate of the super-resolution index as described above was used for the criteria in the evaluation. CNR of the short mark was simultaneously determined for comparison purpose. Super-resolution index and its change rate determined at different levels of read power are shown in Table 1. The super-resolution index is shown in relation to the read power in FIG. 3, and the CNR is shown in relation to the read power in FIG. 4. It should be noted that the evaluation could be no longer continued when the read power was increased to 8 mW because of the damage in the functional layer.

TABLE 1

| Read power (mW) | Super-resolution index | Change rate of super-resolution index |
|---|---|---|
| 1.0 | 0.000 | — |
| 2.0 | 0.023 | 1.000 |
| 3.0 | 0.046 | 0.500 |
| 4.0 | 0.090 | 0.489 |
| 5.0 | 0.102 | 0.118 |

TABLE 1-continued

| Read power (mW) | Super-resolution index | Change rate of super-resolution index |
|---|---|---|
| 6.0 | 0.106 | 0.038 |
| 7.0 | 0.108 | 0.019 |

Figure 4:
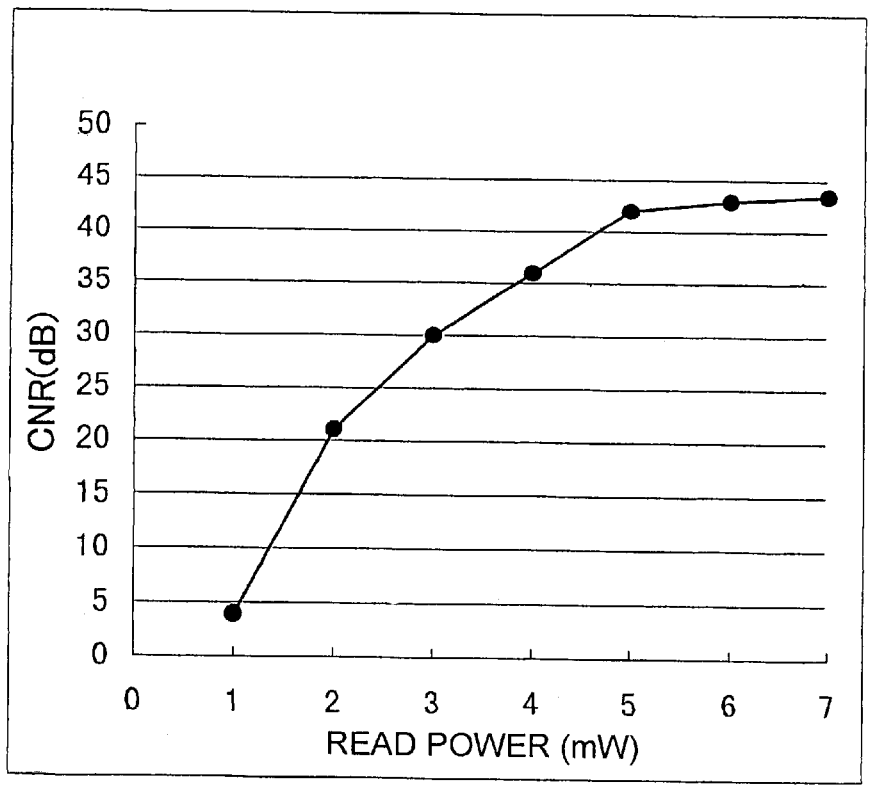
FIG. 4 is a graph showing CNR in relation to the read power in the super-resolution readout medium.

As shown in FIG. 4, the CNR is about 42 dB at the read power of 5 mW, and no substantial increase in the CNR is expected by further increase in the read power. In addition, the functional layer is destructed at the read power of 8 mW. In view of such situation, it should be appropriate to set the optimal read power at 5 mW by taking the CNR and margin for the destruction of the functional layer into consideration.

Figure 3:
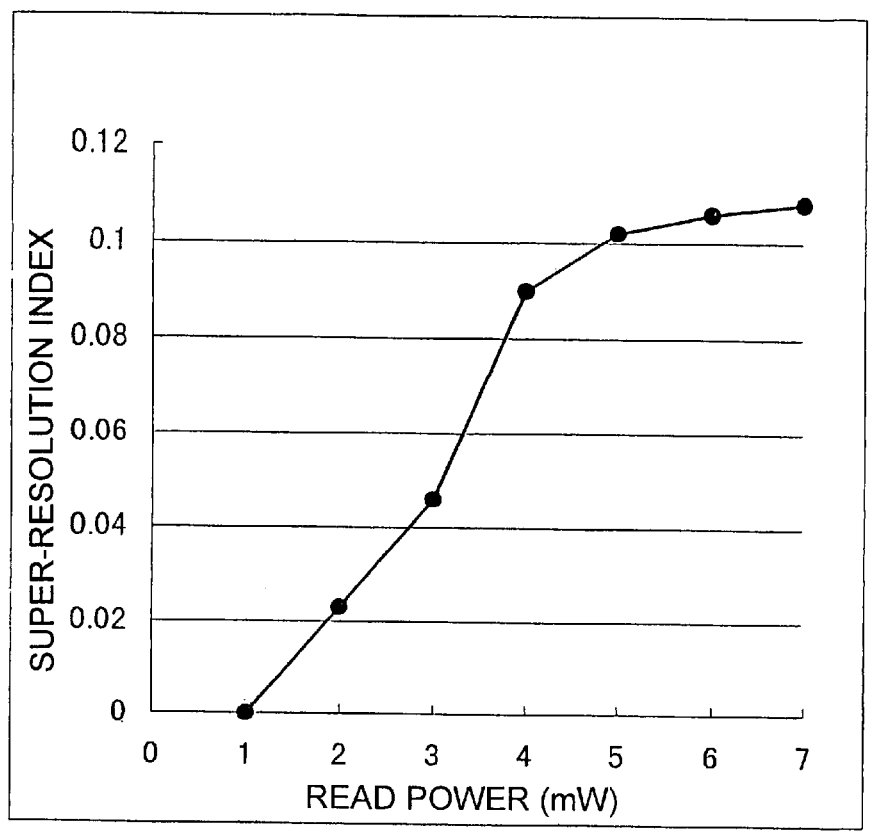
FIG. 3 is a graph showing super-resolution index in relation to the read power in the super-resolution readout medium.

With regard to the super-resolution index and its change rate, the super-resolution index increases with the increase in the read power as shown in FIG. 3. Comparison of FIG. 3 and FIG. 4 reveals that the behavior of the super-resolution index is in substantial correspondence with the CNR. On the other hand, change rate of the super-resolution index reduces with the increase in the read power as shown in Table 1. The change rate of the super-resolution index at the read power of 5 mW is 11.8%. Accordingly, in the optical disc having a functional layer comprising a silicon layer with the thickness of 15 nm used in this Example, the determination of the optimal read power on the bases of the super-resolution index and its change rate can be conducted by selecting the minimum read power that shows the super-resolution index more than the minimum value corresponding to the required CNR, and that shows the change rate of the super-resolution index of not more than, for example 0.12 as the optimal read power. It should be noted that comparison between FIG. 3 and FIG. 4 reveal that, when the CNR required in this optical disc is 35 dB or more, the minimum value of the super-resolution index can be set at around 0.09, and when the required CNR is 40 dB or more, the minimum value of the super-resolution index can be set at around 0.1.

MERITS OF THE INVENTION

In the present invention, optimal read power for the super-resolution of an optical information medium can be readily determined to thereby reduce thermal damage of the mask layer or the functional layer which is critical for the super-resolution reading.

Japanese Patent Application Nos. 11-340538 and 2000-251511 are incorporated herein by reference.

What is claimed is:

1. A method for reading an optical information medium wherein readout is conducted under the conditions wherein the relation:

$$L_{MIN} < \lambda/4NA$$

is met when reading light has a wavelength $\lambda$, objective lens of readout optical system has a numerical aperture NA, and minimum mark of the marks constituting the information pattern has a length $L_{MIN}$; wherein a short mark having a length $L_S$ and a long mark having a length $L_L$ meeting the relations:

$$L_S < \lambda/4NA, \text{ and}$$

$$L_L \cong \lambda/4NA$$

are preliminarily formed in the optical information medium, and the optimal power of the reading light is determined on the output of said short mark and the output of said long mark.

2. A method for reading an optical information medium according to claim 1 wherein said optical information medium has a data recording area and a test read area, and said short mark and said long mark are preliminarily formed in said test read area.

3. An optical information medium wherein readout is conducted under the conditions wherein the relation:

$$L_{MIN} < \lambda/4NA$$

is met when reading light has a wavelength $\lambda$, objective lens of readout optical system has a numerical aperture NA, and minimum mark of the marks constituting the information pattern has a length $L_{MIN}$, and wherein said optical information medium has a data recording area and a test read area and a short mark having a length $L_S$ and a long mark having a length $L_L$ meeting the relations:

$$L_S < \lambda/4NA, \text{ and}$$

$$L_L \cong \lambda/4NA$$

are preliminarily formed in said test area.

* * * * *

UNITED STATES PATENT AND TRADEMARK OFFICE
CERTIFICATE OF CORRECTION

PATENT NO. : 6,430,128 B1
DATED : August 6, 2002
INVENTOR(S) : Tatsuya Kato et al.

It is certified that error appears in the above-identified patent and that said Letters Patent is hereby corrected as shown below:

<u>Title page,</u>
Item [57], ABSTRACT,

Line 12, change "$L_L \cong \lambda/4NA$" to --$L_L \geq \lambda/4NA$--.

<u>Column 3,</u>
Line 57, change "$L_L \cong \lambda/4NA$" to --$L_L \geq \lambda/4NA$--.

<u>Column 4,</u>
Line 18, change "$L_L \cong \lambda/4NA$" to --$L_L \geq \lambda/4NA$--.

<u>Column 5,</u>
Line 9, change "$L_L \cong \lambda/4NA$" to --$L_L \geq \lambda/4NA$--.

<u>Column 10,</u>
Line 63, change "$L_L \cong \lambda/4NA$" to --$L_L \geq \lambda/4NA$--.

<u>Column 12,</u>
Line 9, change "$L_L \cong \lambda/4NA$" to --$L_L \geq \lambda/4NA$--.

Signed and Sealed this

Twenty-eighth Day of January, 2003

JAMES E. ROGAN
*Director of the United States Patent and Trademark Office*